US008810902B2

(12) United States Patent
Sandstrom

(10) Patent No.: US 8,810,902 B2
(45) Date of Patent: Aug. 19, 2014

(54) MULTI-PASS OPTICAL APPARATUS

(75) Inventor: Richard L. Sandstrom, Encinitas, CA (US)

(73) Assignee: ASML Netherlands B.V., Veldhoven (NL)

(*) Notice: Subject to any disclaimer, the term of this patent is extended or adjusted under 35 U.S.C. 154(b) by 488 days.

(21) Appl. No.: 12/980,939

(22) Filed: Dec. 29, 2010

(65) Prior Publication Data

US 2012/0170112 A1 Jul. 5, 2012

(51) Int. Cl.
| G02B 5/08 | (2006.01) |
| H01S 4/00 | (2006.01) |
| G02B 7/182 | (2006.01) |
| G02B 17/00 | (2006.01) |
| G02B 7/18 | (2006.01) |
| H01S 3/07 | (2006.01) |
| H01S 3/23 | (2006.01) |

(52) U.S. Cl.
CPC ........... *G02B 17/004* (2013.01); *G02B 7/1825* (2013.01); *G02B 7/1815* (2013.01); *H01S 3/076* (2013.01); *H01S 3/2325* (2013.01)
USPC ............................ 359/349; 359/857; 359/861

(58) Field of Classification Search
USPC .................................. 359/349, 850, 856–858
See application file for complete search history.

(56) References Cited

U.S. PATENT DOCUMENTS

| 3,436,665 | A | * | 4/1969 | Rigrod ........................... 359/346 |
| 3,625,585 | A | * | 12/1971 | Beiser ........................ 359/223.1 |
| 3,895,313 | A | * | 7/1975 | Seitz ............................. 372/103 |
| 3,942,127 | A | * | 3/1976 | Fluhr et al. .................... 359/347 |
| 4,093,924 | A | * | 6/1978 | Farcy .......................... 359/347 |
| 4,156,852 | A | * | 5/1979 | Hagen .......................... 359/348 |
| 4,345,212 | A | * | 8/1982 | Seppala et al. ................. 359/349 |
| 4,734,911 | A | * | 3/1988 | Bruesselbach .................. 372/21 |
| 4,872,179 | A | * | 10/1989 | Nitsche et al. .................. 372/93 |
| 4,982,166 | A | * | 1/1991 | Morrow ........................ 359/349 |
| 5,309,456 | A |   | 5/1994 | Horton |
| 5,440,143 | A |   | 8/1995 | Carangelo et al. |
| 5,615,043 | A | * | 3/1997 | Plaessmann et al. ......... 359/346 |
| 5,751,472 | A |   | 5/1998 | Jeys et al. |
| 5,867,329 | A | * | 2/1999 | Justus et al. .................. 359/861 |
| 7,006,283 | B2 | * | 2/2006 | Lefort et al. .................. 359/347 |
| 7,087,914 | B2 |   | 8/2006 | Akins et al. |

(Continued)

OTHER PUBLICATIONS

Blaine R. Copenheaver, International Searching Authority/US, PCT International Search Report in counterpart foreign application PCT/US2011/057717, Feb. 14, 2012, 2 pages.

(Continued)

*Primary Examiner* — Eric Bolda
(74) *Attorney, Agent, or Firm* — DiBerardino McGovern IP Group LLC

(57) ABSTRACT

An apparatus includes a first plurality of concave reflecting surfaces; a second plurality of reflecting surfaces facing the first plurality of concave reflecting surfaces such that a region is defined between the first and second pluralities; and an input for an optical beam to enter the region and an output for the optical beam to exit the region. The first and second pluralities of reflecting surfaces are arranged relative to each other so that the optical beam is re-imaged at a reflecting surface of one of the pluralities after only one reflection from a reflecting surface of the other of the pluralities and so that overlap of two or more optical beams on each of the reflecting surfaces is avoided.

24 Claims, 12 Drawing Sheets

(56) References Cited

U.S. PATENT DOCUMENTS

| | | |
|---|---|---|
| 7,164,144 B2 | 1/2007 | Partlo et al. |
| 7,187,820 B1 | 3/2007 | Stone et al. |
| 7,241,038 B2 * | 7/2007 | Naniwa et al. ............... 362/525 |
| 7,307,716 B2 | 12/2007 | Silver |
| 7,369,597 B2 | 5/2008 | Smith et al. |
| 7,372,056 B2 | 5/2008 | Bykanov et al. |
| 7,405,416 B2 | 7/2008 | Algots et al. |
| 2006/0232772 A1 | 10/2006 | Silver |
| 2006/0255298 A1 | 11/2006 | Bykanov et al. |
| 2007/0242720 A1 | 10/2007 | Eckles et al. |
| 2009/0014668 A1 | 1/2009 | Vaschenko |
| 2009/0161201 A1 | 6/2009 | Ershov et al. |
| 2009/0230326 A1 | 9/2009 | Vaschenko et al. |
| 2010/0107733 A1 | 5/2010 | Miklos et al. |
| 2010/0195196 A1 * | 8/2010 | Nowak et al. ............... 359/345 |
| 2010/0294953 A1 | 11/2010 | Vaschenko et al. |

OTHER PUBLICATIONS

Blaine R. Copenheaver, International Searching Authority/US, Written Opinion of the International Searching Authority in counterpart foreign application PCT/US2011/057717, Feb. 14, 2012, 6 pages.

Dipankar Das and Andrew C. Wilson, "Very long optical path-length from a compact multi-pass cell," viewable at http://arxiv.org/PS_cache/arxiv/pdf/1007/1007.4613v1.pdf, published Jul. 27, 2010, 5 pages.

Toptica Photonics AG, "Herriott Type Cell, Multipass Cell," published in Jan. 2004 at www.toptica.com, 4 pages.

* cited by examiner

MULTI-PASS OPTICAL APPARATUS

TECHNICAL FIELD

The disclosed subject matter relates to a multi-pass optical apparatus that can be used as an optical time delay system for an optical beam such as a laser beam.

BACKGROUND

Two commonly used multi-pass optical cells are the White cell and the Herriott cell. In the White cell, light bounces back and forth repeatedly between three spherical mirrors. In the Herriott cell, light bounces back and forth repeatedly between two concave mirrors.

SUMMARY

In some general aspects, a method includes reflecting an optical beam back and forth between reflecting surfaces of a first plurality of reflecting surfaces and reflecting surfaces of a second plurality of reflecting surfaces so that the optical beam is re-imaged at a reflecting surface of one of the pluralities after only one reflection from a reflecting surface of the other of the pluralities; and so that overlap of two or more optical beams on each of the reflecting surfaces of both of the pluralities is avoided.

Implementations can include one or more of the following features. For example, the optical beam can be reflected back and forth between reflecting surfaces of the first plurality of reflecting surfaces and reflecting surfaces of the second plurality of reflecting surfaces by re-imaging the optical beam from a first reflecting surface of the first plurality onto a second reflecting surface of the first plurality. The optical beam can be re-imaged from the first reflecting surface of the first plurality onto the second reflecting surface of the first plurality by reflecting the optical beam from a reflecting surface of the second plurality. The second reflecting surface of the first plurality on which the optical beam is re-imaged can be adjacent to the first reflecting surface of the first plurality.

The optical beam can be reflected back and forth between reflecting surfaces of the first plurality of reflecting surfaces and reflecting surfaces of the second plurality of reflecting surfaces by re-imaging the optical beam from a first reflecting surface of the second plurality onto a second reflecting surface of the second plurality. The optical beam can be re-imaged from the first reflecting surface of the second plurality onto the second reflecting surface of the second plurality by reflecting the optical beam from a reflecting surface of the first plurality.

The optical beam can be re-imaged at a reflecting surface of one of the pluralities after only one reflection from a reflecting surface of the other of the pluralities by forming a beam waist between the first and second pluralities of reflecting surfaces.

The optical beam can be re-imaged at a reflecting surface of one of the pluralities after only one reflection from a reflecting surface of the other of the pluralities by forming a virtual beam waist outside a region between the first and second pluralities of reflecting surfaces.

The optical beam can be directed through an opening within the first plurality of reflecting surfaces and toward the second plurality of reflecting surfaces prior to reflecting the optical beam back and forth. The optical beam can be directed through an opening within the second plurality of reflecting surfaces and away from the first plurality of reflecting surfaces after to reflecting the optical beam back and forth.

In another general aspect, an apparatus includes a first plurality of concave reflecting surfaces; a second plurality of reflecting surfaces facing the first plurality of concave reflecting surfaces such that a region is defined between the first and second pluralities; and an input for an optical beam to enter the region and an output for the optical beam to exit the region. The first and second pluralities of reflecting surfaces are arranged relative to each other so that the optical beam is re-imaged at a reflecting surface of one of the pluralities after only one reflection from a reflecting surface of the other of the pluralities and so that overlap of two or more optical beams on each of the reflecting surfaces is avoided.

Implementations can include one or more of the following features. For example, the first and second pluralities of reflecting surfaces can be arranged relative to each other so that the optical beam is re-imaged at each of the concave reflecting surfaces of the first plurality after only one reflection from a reflecting surface of the second plurality.

Each concave reflecting surface of the first plurality can be formed on a distinct substrate. Each substrate of the first plurality can be separately movable from the other substrates of the first plurality. Each reflecting surface of the second plurality can be formed on a distinct substrate. Each substrate of the second plurality can be separately movable from the other substrates of the second plurality.

The number of concave reflecting surfaces of the first plurality can be even. The number of reflecting surfaces of the second plurality can be even.

The concave reflecting surfaces of the first plurality can be arranged so that centers of the concave reflecting surfaces are on a perimeter of a circle. The reflecting surfaces of the second plurality can be arranged so that centers of the reflecting surfaces are on a perimeter of a circle.

Each of the reflecting surfaces of the second plurality can be a concave reflecting surface. The first and second pluralities of reflecting surfaces can be arranged relative to each other so that a beam waist of the optical beam is formed inside the region.

Each of the reflecting surfaces of the second plurality can be a convex reflecting surface. The first and second pluralities of reflecting surfaces can be arranged relative to each other so that a virtual beam waist of the optical beam is formed outside the region.

A curvature of each of the concave reflecting surfaces of the first plurality can be selected such that the optical beam is re-imaged after each reflection from a reflecting surface of the second plurality.

In another general aspect, an optical source includes a master oscillator that outputs an optical beam; at least one amplifier that receives the optical beam; and an optical delay apparatus between the master oscillator and the at least one amplifier. The optical delay apparatus includes a first plurality of concave reflecting surfaces; a second plurality of reflecting surfaces facing the first plurality of concave reflecting surfaces, such that a region is defined between the first and second pluralities; and an input for the optical beam to enter the region and an output for the optical beam to exit the region. The first and second pluralities of reflecting surfaces are arranged relative to each other so that the optical beam is re-imaged at a reflecting surface of one of the pluralities after only one reflection from a reflecting surface of the other of the pluralities and so that overlap of two or more optical beams on each of the concave reflecting surfaces is avoided.

In another general aspect, an amplifier includes a first plurality of concave reflecting surfaces; and a second plurality of reflecting surfaces facing the first plurality of concave reflecting surfaces such that a region is defined between the first and second pluralities, an input for an optical beam to enter the region and an output for the optical beam to exit the region; and a gain medium within the region. The first and second pluralities of reflecting surfaces are arranged relative to each other so that the optical beam is re-imaged at a reflecting surface of one of the pluralities after only one reflection from a reflecting surface of the other of the pluralities and so that overlap of two or more optical beams on each of the reflecting surfaces is avoided.

DRAWING DESCRIPTION

DESCRIPTION

Figure 1:
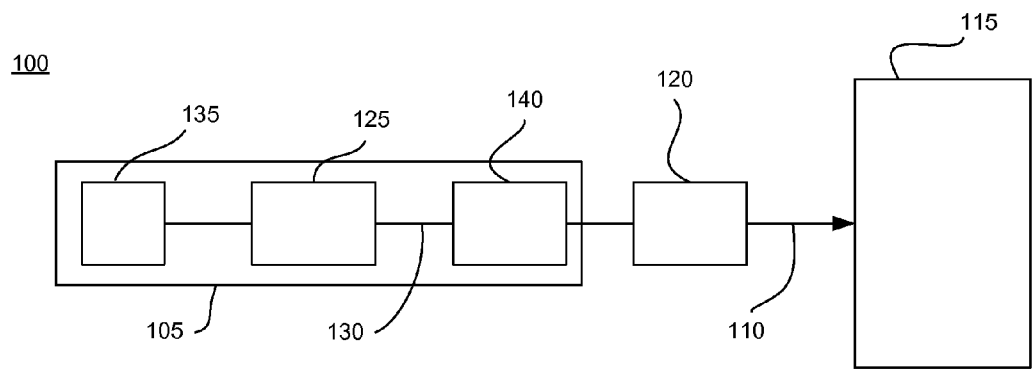
FIG. 1 is a block diagram of an exemplary optical system including a multi-pass optical apparatus.

Referring to FIG. 1, an optical system 100 includes a light production system 105 that delivers an optical beam 110 to external equipment (such as a photolithography apparatus) 115 that uses the optical beam 110 for a purpose. The optical system 100 can also include a beam conditioning unit 120 having optics for performing one or more optical transformations such as expanding, steering, pulse shaping, or shaping the optical beam 110 between the light production system 105 and the equipment 115.

Details about exemplary beam conditioning units 120 can be found in U.S. Pat. No. 7,087,914, issued on Aug. 8, 2006 and U.S. Pat. No. 7,164,144, issued on Jan. 16, 2007; and U.S. application Ser. No. 12/638,092, filed on Dec. 15, 2009, entitled BEAM TRANSPORT SYSTEM FOR EXTREME ULTRAVIOLET LIGHT SOURCE, the contents of each of which are hereby incorporated by reference.

The light production system 105 includes, among other features, a multi-pass optical apparatus 125 that, in this case, serves to delay an optical beam 130 by a time that depends on the internal optics and design of the optical apparatus 125. Thus, using an estimated light speed of about $3 \times 10^8$ meters per second, each meter of beam delay within the optical apparatus 125 adds an additional 3.33 nanoseconds of travel time for the optical beam 130.

As will be discussed in greater detail below, the optical apparatus 125 includes at least a first set of reflecting surfaces and a second set of concave reflecting surfaces that generally face each other and are arranged relative to each other so that the optical beam 130 is reflected back and forth in a region between the reflecting surfaces of the first plurality and the reflecting surfaces of the second plurality. The optical beam 130 is re-imaged at each reflecting surface of one of the pluralities after only one reflection from the reflecting surface of the other of the pluralities. Moreover, overlap of two or more optical beams on each of the reflecting surfaces is avoided. That is, only one reflection from each reflective surface is allowed, to avoid beam overlap each a reflective surface, and to reduce the chance that peak intensities reach damaging levels due to coherent addition of the optical beams.

The optical apparatus 125 has a design that is compact and practical, avoids damage to internal optics by avoiding optical beam overlap on any of the reflecting surfaces within the optical apparatus 125, and maintains a beam size of the optical beam 130 by repeatedly re-imaging the beam through the optical apparatus 125. In some implementations, the optical apparatus 125 is maintained in a controlled environment, such as a low-pressure or low moisture environment.

The optical system 100 can be an extreme ultraviolet (EUV) optical source such as a laser-produced plasma optical source. EUV light is electromagnetic radiation having wavelengths of around 50 nm or less (also sometimes referred to as soft x-rays), and includes light at a wavelength of about 13 nm. EUV light from the optical system 100 can be used in photolithography processes to produce extremely small features in substrates, for example, silicon wafers. If the optical system 100 is an EUV optical source, then the light production system 105 can also include a master oscillator 135 producing an output beam (the optical beam 130) that is directed onto a beam path through the optical apparatus 125 and toward an amplifier 140. The optical beam 110 output from the amplifier 140 is then directed toward the equipment 115, which, in this particular implementation, is a sealed vessel, such as a vacuum chamber, that includes a target material (such as, a droplet, a stream, or a cluster of material) that is irradiated by the optical beam 110. In a laser-produced plasma design, EUV light is produced by converting the target material into a plasma state that has an element, for example, xenon, lithium, or tin, with an emission line in the EUV range. The target material is converted into a plasma state by irradiating the target material, with the optical beam (which is an amplified light beam) 110. The plasma is produced in the equipment 115, which is the vacuum chamber, and the plasma can be monitored using various types of metrology equipment. The EUV light produced by the plasma is output from the optical system 100 toward the substrate of the photolithography process.

In the implementation in which the equipment 115 includes a vacuum chamber, a target material delivery system is also a part of the equipment 115, the target material delivery system configured to deliver droplets of the target material into the interior of the vacuum chamber to an irradiation region, where the droplets will interact with the optical beam 110 to ultimately produce plasma and generate an EUV emission. More details regarding various droplet dispenser configurations and their relative advantages may be found in U.S. Publication Nos. 2010/0294953, published on Nov. 25, 2010, entitled LASER PRODUCED PLASMA EUV LIGHT SOURCE; 2009/0230326, published on Sep. 17, 2009, entitled SYSTEMS AND METHODS FOR TARGET MATERIAL DELIVERY IN A LASER PRODUCED PLASMA EUV LIGHT SOURCE; 2009/0014668, published on Jan. 15, 2009, entitled LASER PRODUCED PLASMA EUV LIGHT SOURCE HAVING A DROPLET STREAM PRODUCED USING A MODULATED DISTURBANCE WAVE; 2006/0255298, published on Nov. 16, 2006, entitled Laser produced plasma EUV light source with pre-pulse; and U.S. Pat. Nos. 7,405,416 and 7,372,056; the contents of each of which are hereby incorporated by reference.

Figure 2:
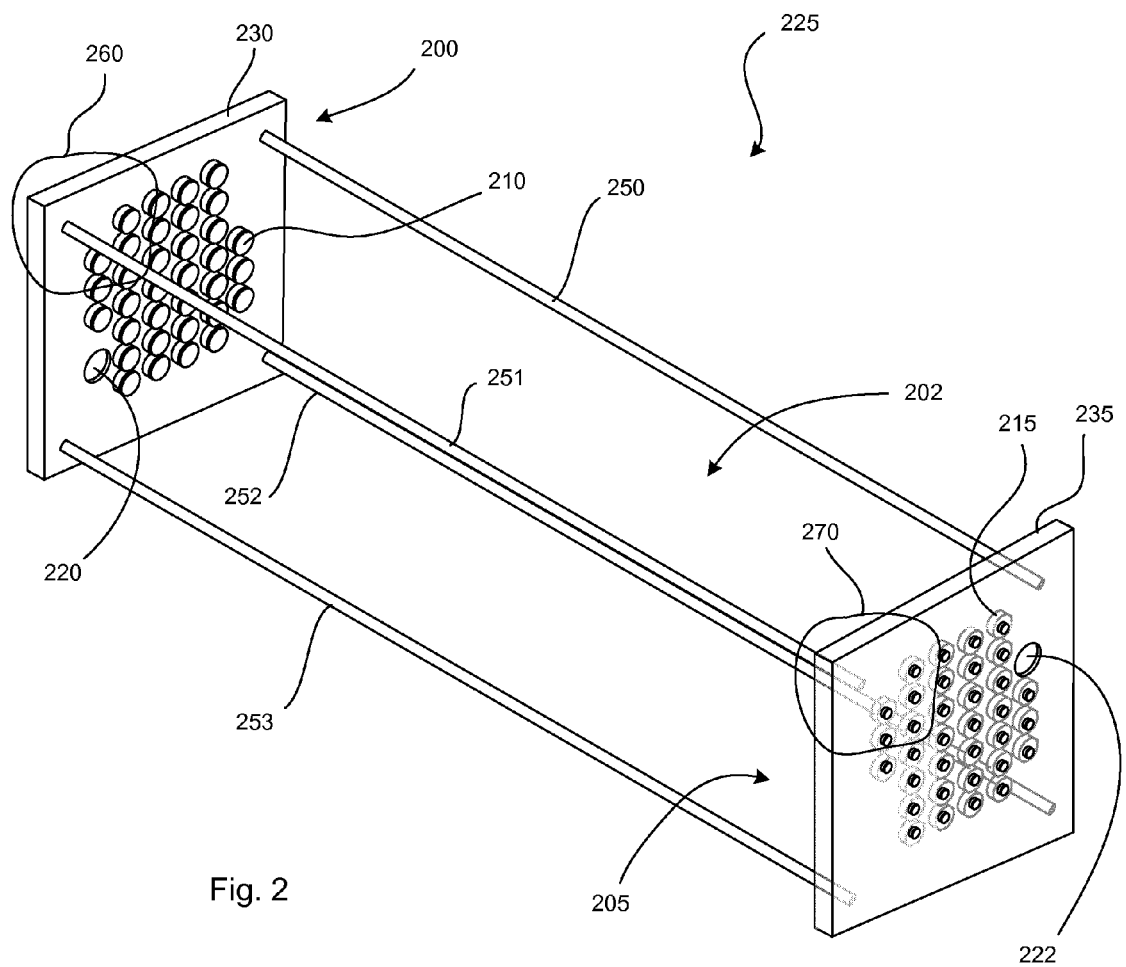
FIG. 2 is perspective view of an exemplary multi-pass optical apparatus that can be used in the optical system of FIG. 1.

Referring to FIG. 2, in an implementation, an exemplary optical apparatus 225 includes a first set 200 of concave reflecting surfaces 210 and a second set 205 of concave reflecting surfaces 215 that define a region 202 through which the optical beam 130 travels. The reflecting surface 210, 215 of the first and second sets 200, 205 generally face each other. These reflecting surfaces 210, 215 are arranged relative to each other so that at least one of the concave reflecting surfaces in the first set 200 re-images an optical beam reflected from a first concave reflecting surface of the second set 205 to a second concave reflecting surface of the second set 205 and so that overlap of two or more optical beams on each of the concave reflecting surfaces in each of the sets 200, 205 is avoided, as will be detailed below. Likewise, at least one of the concave reflecting surfaces in the second set 205 re-images an optical beam reflected from a first concave reflecting surface of the first set 200 to a second concave reflecting surface of the first set 200. Moreover, the radius of curvature of each of the reflecting surfaces 210, 215 is chosen to provide for re-imaging after only one reflection from a reflecting surface.

The optical apparatus 225 also includes an entrance 220 for receiving the optical beam 130 and an exit 222 through which the optical beam 130 is transmitted after the optical beam 130 has bounced back and forth within the region 202 between the first set 200 and the second set 205. The reflecting surfaces 210, 215 of the respective sets 200, 205 can be mounted on substrates (as shown below), which are mounted to respective bases 230, 235. As shown in the implementation described, the entrance 220 is adjacent the first set 200 and the exit 222 is adjacent the second set 205. However, in other implementations, the entrance 220 could be adjacent the second set 205 and the exit could be adjacent the first set 200.

The optical apparatus 225 can also include one or more rigid spacers 250, 251, 252, 253 that maintain a constant distance between the respective bases 230, 235. The combination of the rigid spacers 250, 251, 252, 253 and the bases 230, 235 can be referred to as the system frame, which serves to support the optical components of the optical apparatus 225.

The optical beam 130 is injected into the optical apparatus 225 and has a beam size that is acceptable at the entrance 220 and at the first reflecting surface opposite the entrance 220, where an "acceptable" beam size means the optical beam 130 does not achieve too high an intensity, nor does it overfill the reflecting surfaces. The reimaging within the optical apparatus 225 then reproduces these beam profiles on succeeding reflecting surfaces.

In one specific implementation, the optical beam 130 forms a beam waist along a plane (generally depicted by line 204 in FIG. 7) within the region 202 so that the optical beam 130 converges after reflection from one of the reflecting surfaces 210 or 215 toward the beam waist after which the optical beam 130 diverges toward the next reflecting surface 215 or 210. If the reflecting surfaces 210, 215 all have the same radius of curvature and the same focal length, then the beam waist plane 204 will be about half way between the reflecting surfaces 210, 215. In this case, the optical beam 130 is re-imaged repeatedly from one end to the other.

The optical apparatus 225 has a design that is compact and practical, avoids damage to internal optics such as the reflecting surfaces of the sets 200, 205 by avoiding overlap of the optical beam 130 on the reflecting surfaces of the sets 200, 205, and maintains a beam size of the optical beam 130 by repeatedly re-imaging the beam through the optical apparatus 925 after each reflection from a reflecting surface.

Figure 3:
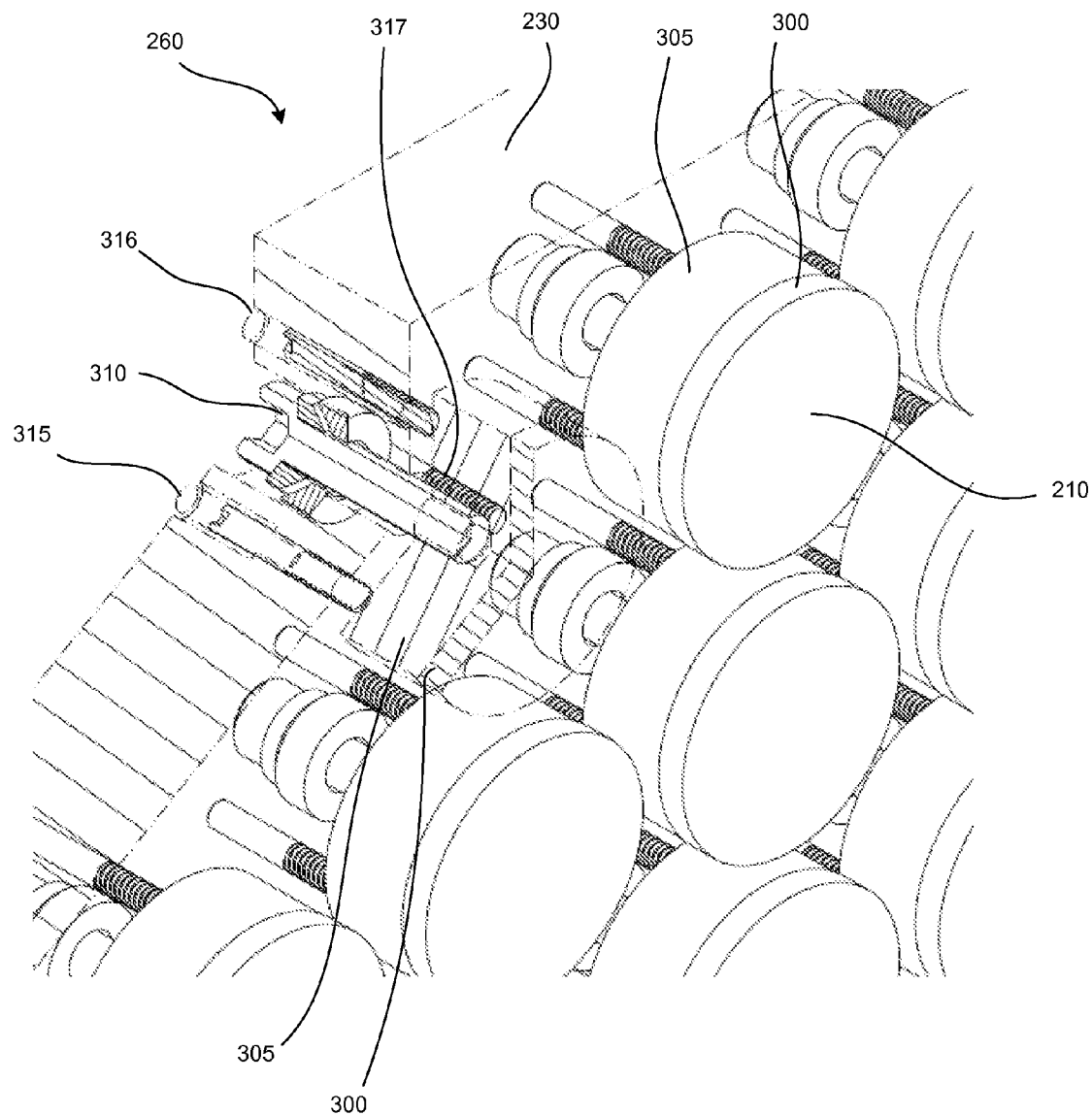
FIG. 3 is a close-up of the perspective view of a first set of reflecting surfaces of the exemplary multi-pass optical apparatus of FIG. 2.

Referring to FIG. 3, each of the reflecting surfaces 210 of the first set 200 can be formed as a coating on a substrate 300. For higher optical throughput efficiency, the coating should be highly reflective at the wavelength of use. The coating might be a dielectric multilayer, a dielectric-enhanced metal, or bare metal coating, according to the wavelength of the optical beam 130. The substrate 300 can be any metal or glass material commonly used for mirror fabrication. In some implementations, the coating can be a highly reflective coating such as a maximum metal reflector (MMR) coating produced by II-VI Infrared of Saxonburg, Pa. and the substrate 300 can be silicon. Other coatings that can be used include gold and silver, and other substrates 300 to which the coating can be applied include oxygen-free high conductivity (OFHC) copper substrate, molybdenum, and aluminum. Each substrate 300 is attached (for example, adhered or mounted) to a plate 305, which can be made of a suitable material such as aluminum. If appropriate, the substrate 300 can be merged with the plate 305 into a single component.

Figure 4:
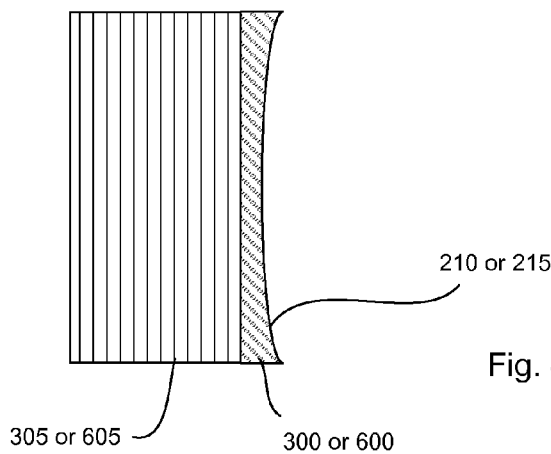
FIG. 4 is a side cross-sectional view of a reflecting surface and substrate that can be used in the multi-pass optical apparatus of FIG. 2.

Each of the reflecting surfaces 210 of the first set 200 (and also the reflecting surfaces 215 of the second set 205) is concave (also called converging) in that the surfaces are bulging inward, toward the substrate 300, as shown by the cross-sectional view in FIG. 4. The concave shape can be spherical, or another suitable shape, depending on the focal length of each of the reflecting surfaces and the beam size of the optical beam 130. For example, for an f-number (the ratio of the focal length of the reflecting surfaces to the beam size (the diameter of the optical beam 130)) that is higher than about 10, the concave shape can be spherical but for an f-number that is lower than 10, the concave shape can be an off-axis paraboloid to reduce the off-axis aberrations (such as spherical aberrations or coma) in the optical beam 130.

Figure 5:
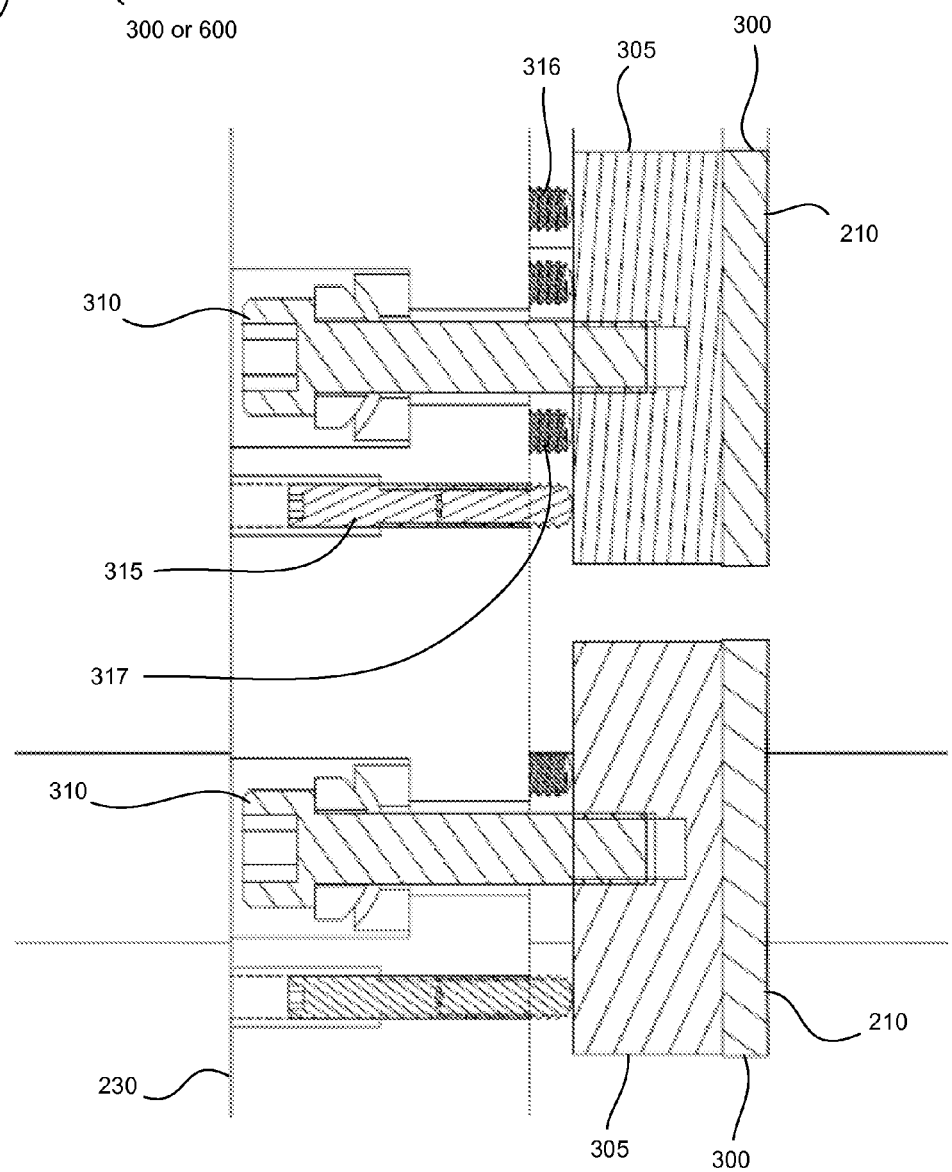
FIG. 5 is a side cross-sectional view of reflecting surfaces, substrates, and a base that can be used in the multi-pass optical apparatus of FIG. 2.

Referring also to FIG. 5, each plate 305 is movably attached to the base 230 through an attachment device 310, which can frictionally mate with an opening in the back side of the plate 305. Moreover, the plate 305 can be mounted to the base 230 in such a way that provides for independent adjustment in one or more of its degrees of freedom without interaction with other potential degrees of freedom. The mounting should be sturdy, insensitive to extraneous vibrational disturbances, and free of backlash during adjustment. Temperature variations in the mounting can be reduced by selecting an appropriate material for the mount. In one implementation, the plate 305 is mounted to the base 230 by way of a tip-tilt mechanism that includes three adjustable actuators 315, 316, 317. In this case, each actuator 315, 316, 317 is movable along its axis by rotation and has a tip that contacts a back side of the plate 305 so that rotation of each actuator 315, 316, 317 causes the plate 305 (and therefore the substrate 300 attached to the plate 305) to move at the contact point with the respective actuator 315, 316, 317. Other mounts are possible.

The substrate 300 (and the substrate on which the reflecting surface 215 is mounted) can be cooled by the plate 305 depending on the power of the optical beam 130 that impinges upon the reflecting surface 215. In some implementations, additional cooling can be provided by cooling the base 230 using any suitable cooling system, which can be passive or active. In some implementations, the base 230 is cooled with a heat transfer liquid, for example, by flowing water or some other appropriate coolant through holes of the base 230.

Figure 6:
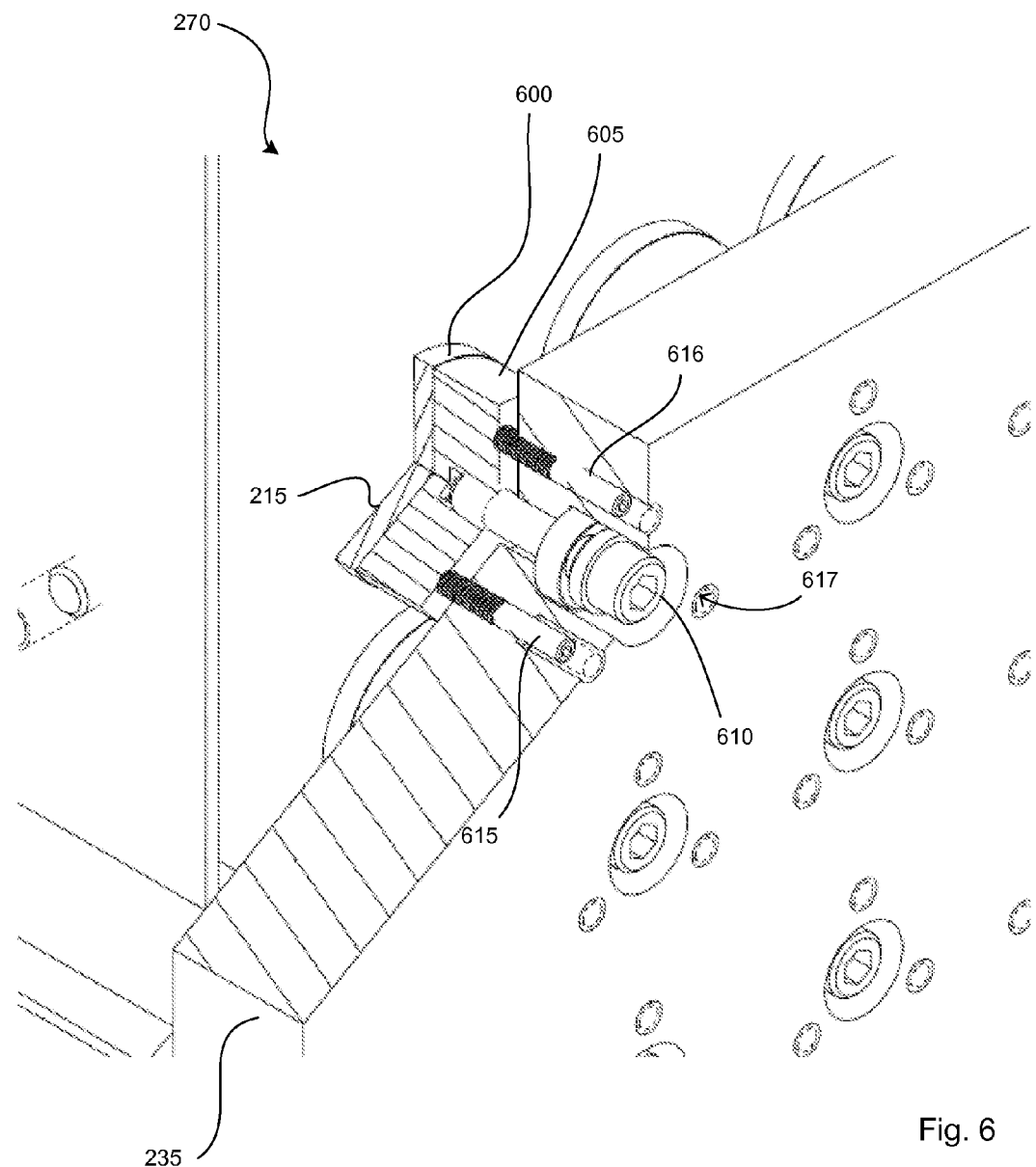
FIG. 6 is a close-up of the perspective view of a second set of reflecting surfaces of the exemplary multi-pass optical apparatus of FIG. 2.

Referring also to FIG. 6, each of the reflecting surfaces 215 of the second set 205 can be formed as a coating on a substrate 600. The configuration and materials of the second set 205 are similar to that of the first set 200, and so are not repeated here. Moreover, each of the reflecting surfaces 215 of the second set 205 is concave, as shown by the cross-sectional view in FIG. 4. Each substrate 600 is attached (for example, adhered or mounted) to a plate 605.

Mounting and cooling of each plate 605 is similar to the mounting and cooling of each plate 305, and its description is not repeated in detail here. In particular, the plate 605 is attached to the base 235 using an attachment device 610, and is movable relative to the base 235 by way of a tip-tilt mechanism that includes three adjustable actuators 615, 616, 617. Each of the plates 605 (and therefore each of the reflecting surfaces 215) of the second set 205 is independently (or separately) movable from the other plates 605 of the second set 205.

In a specific implementation in which the coating of each reflecting surface 210, 215 is an MMR coating on an Si substrate 300, 600, each substrate 300, 600 has a diameter of ⅞" and a thickness of about 0.118", and the reflecting surfaces have a radius of curvature of about 2.12 m and a clear aperture of up to 20 mm. The overall dimension of the array of reflecting surfaces 210, 215 on the respective bases 230, 235 is 10"×10" and the distance between the bases 230, 235 is about 2.5 m. If each base 230, 235 holds 24 reflecting surfaces 210 or 215 (so there is a total of 48 in the optical apparatus 225), then the delay path length is about 104 m and the delay through the optical apparatus 225 is about 350 ns.

During alignment, each of the plates 305, 605 in the respective sets 200, 205 can be adjusted using the adjustable actuators, and after initial alignment, the plates 305, 605 can be locked in place. The radii of curvature of each of the substrates 300, 600, and therefore each of the reflecting surfaces 210, 215 can be matched.

Figure 7:
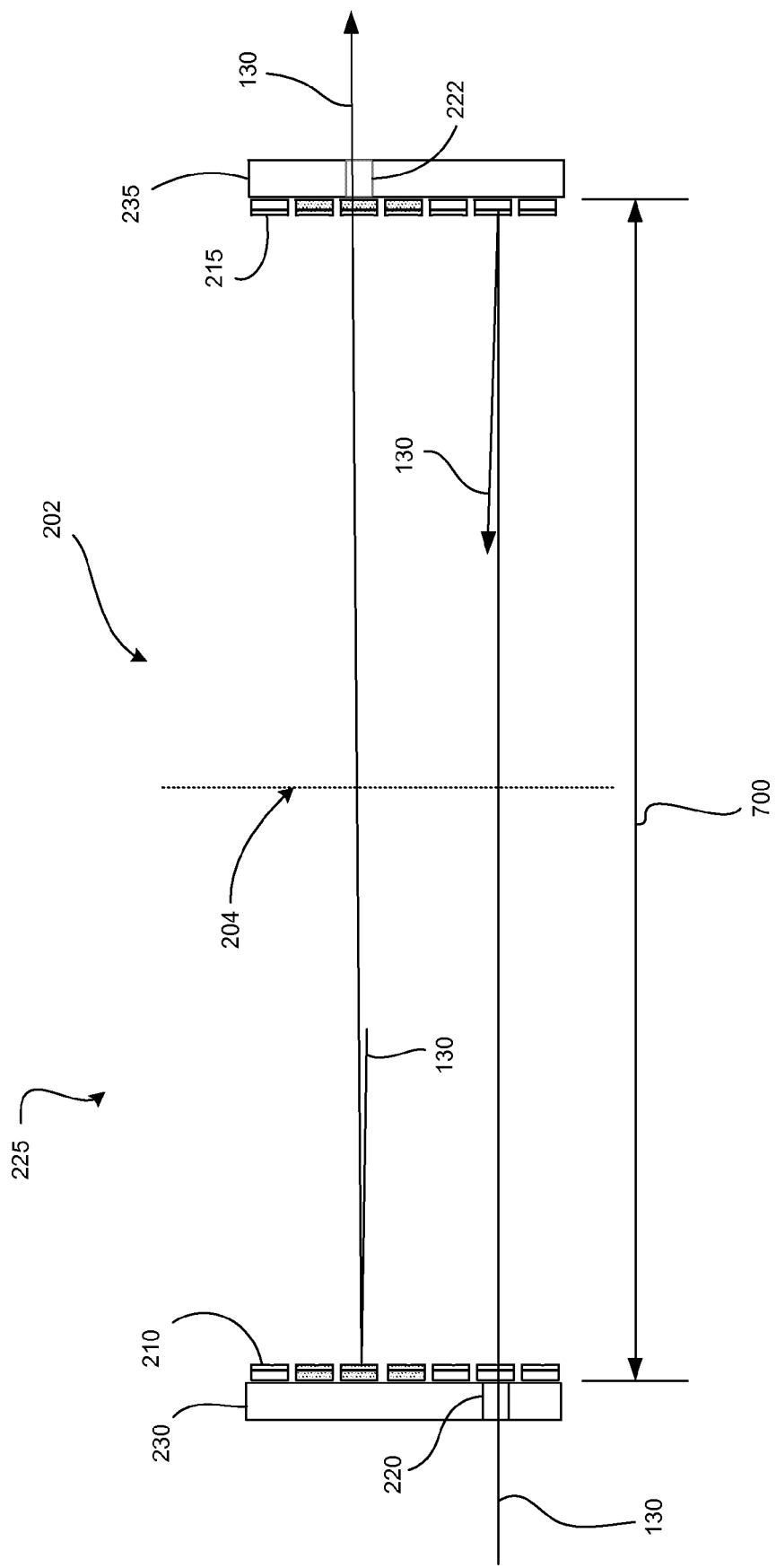
FIG. 7 is a side view of the multi-pass optical apparatus of FIG. 2, showing an exemplary optical path.

Referring also to FIG. 7, a spacing 700 between the base 230 and the base 235 (and therefore, the relative spacing between the reflecting surfaces 210, 215) can be selected to provide for quasi-confocal spacing and maintain a beam size of the optical beam 130 as it reflects off each reflecting surface 210, 215 of the optical apparatus 225. The spacing is quasi-confocal in that it provides for the re-imaging of the optical beam 130 exiting a reflecting surface of a first of the sets 200 or 205 after the optical beam 130 reflects from only one reflecting surface at a second of the sets 205 or 200 and is directed back toward another reflecting surface of the first of the sets 200 or 205. Quasi-confocal means that the foci of each of the reflecting surfaces are at the same position along a line between the two sets 200 and 205, but the foci are laterally offset from the line due to the tilt of the reflecting surfaces, which allows the beam path to progress from reflecting surface to reflecting surface.

Moreover, focusing of the optical beam 130 as it reflects of each reflecting surface 210, 215 can be adjusted by adjusting the spacing 700 between the bases 230, 235. The geometric arrangement of the reflecting surfaces 210, 215 is selected to prevent the optical beam 130 from overlapping on itself at a point on any of the reflecting surfaces 210, 215.

Figure 8:
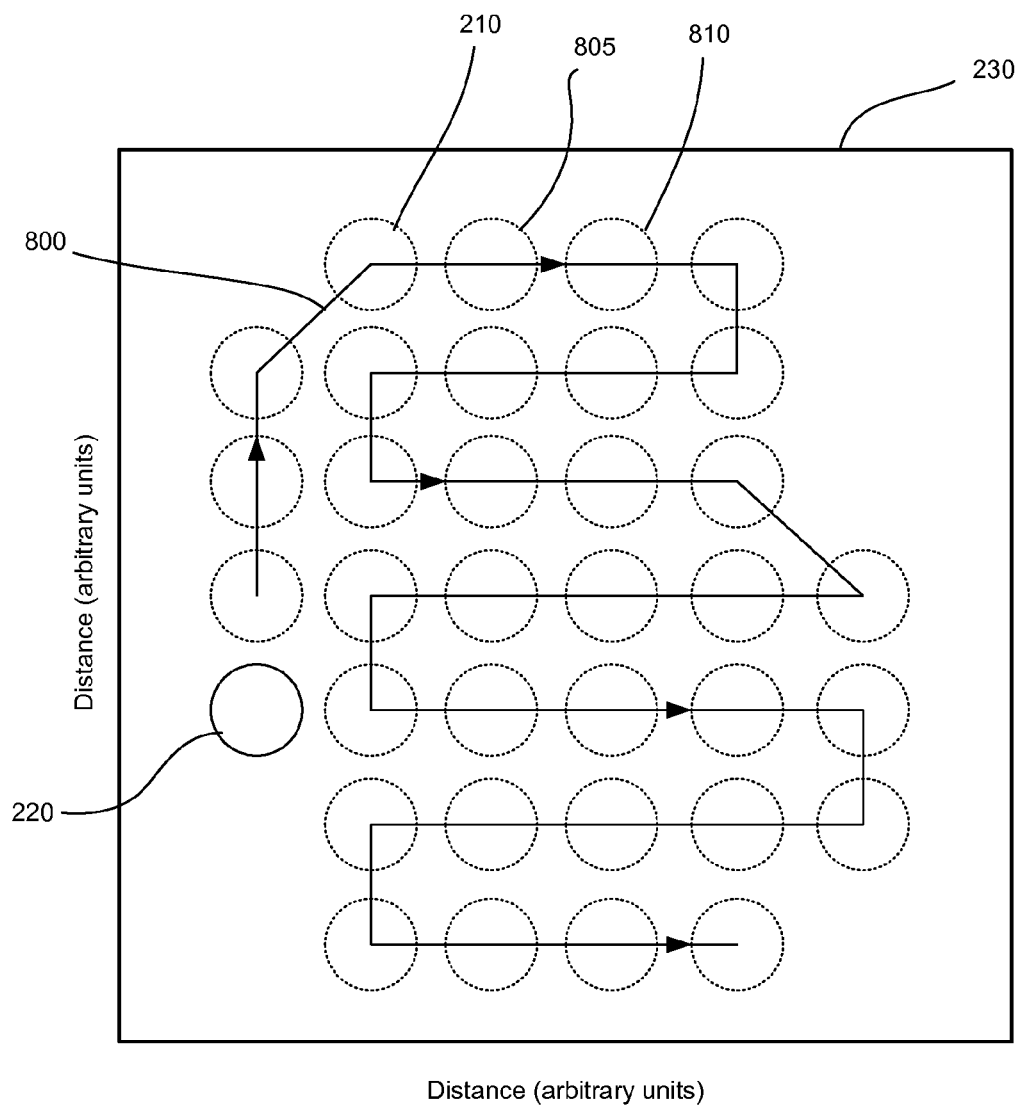
FIG. 8 is a plan view of a first set of reflecting surfaces of the multi-pass optical apparatus of FIG. 2, showing a sequence of bounces at the reflecting surfaces of the first set.

Referring also to FIG. 8, the optical beam 130 that enters through the entrance 220 in the base 230 reflects off one of the reflecting surfaces 215 of the second set 205, after which it reflects off one of the reflecting surfaces 210 of the first set 200. In this example, the optical beam 130 can follow a trace 800 from each of the reflecting surfaces 210 of the first set 200 to the next reflecting surface 210 of the first set 200 after each reflection from a reflecting surface 215 of the second set 205, and such that the optical beam 130 does not strike a single reflecting surface 210 or 215 more than once or overlap.

Taking two adjacent reflecting surfaces 805, 810 of the first set 200 as an example, the optical beam 130 reflects from the reflecting surface 805 of the first set 200, travels across the region 202 between the bases 230, 235, then reflects from a reflecting surface (not shown) of the second set 205, after which the optical beam travels back across the region 202 between the bases 230, 235 and impinges upon the reflecting surface 810. The shape of the reflecting surface of the second set 205 is such that the optical beam 130 is re-imaged from the surface 805 to the surface 810, both surfaces 805, 810 being in the same set, which, in this case, is the first set 200. Moreover, overlap of the optical beam 130 on the reflecting surface of the second set 205 is avoided. It should be noted that this re-imaging occurs for each of the reflecting surfaces in each of the sets 200, 205 after the optical beam 130 passes through the entrance 220 and reflects of the first reflecting surface and prior to the optical beam 130 passing through the exit 222. Additionally, the cross-sectional size of the optical beam 130 is generally maintained at each reflecting surface of one of the sets as it travels between the sets.

An exemplary trace 800 is shown, but other traces are possible, and the path of the trace can depend on the geometric configuration, the size, and the focal lengths of the reflecting surfaces of the sets 200, 205. It may be preferable to keep the off-axis angle between the reflecting surfaces to a minimum, which means that the trace through the optical apparatus 225 proceeds to adjacent or nearby reflecting surfaces in the particular pattern.

Figure 9:
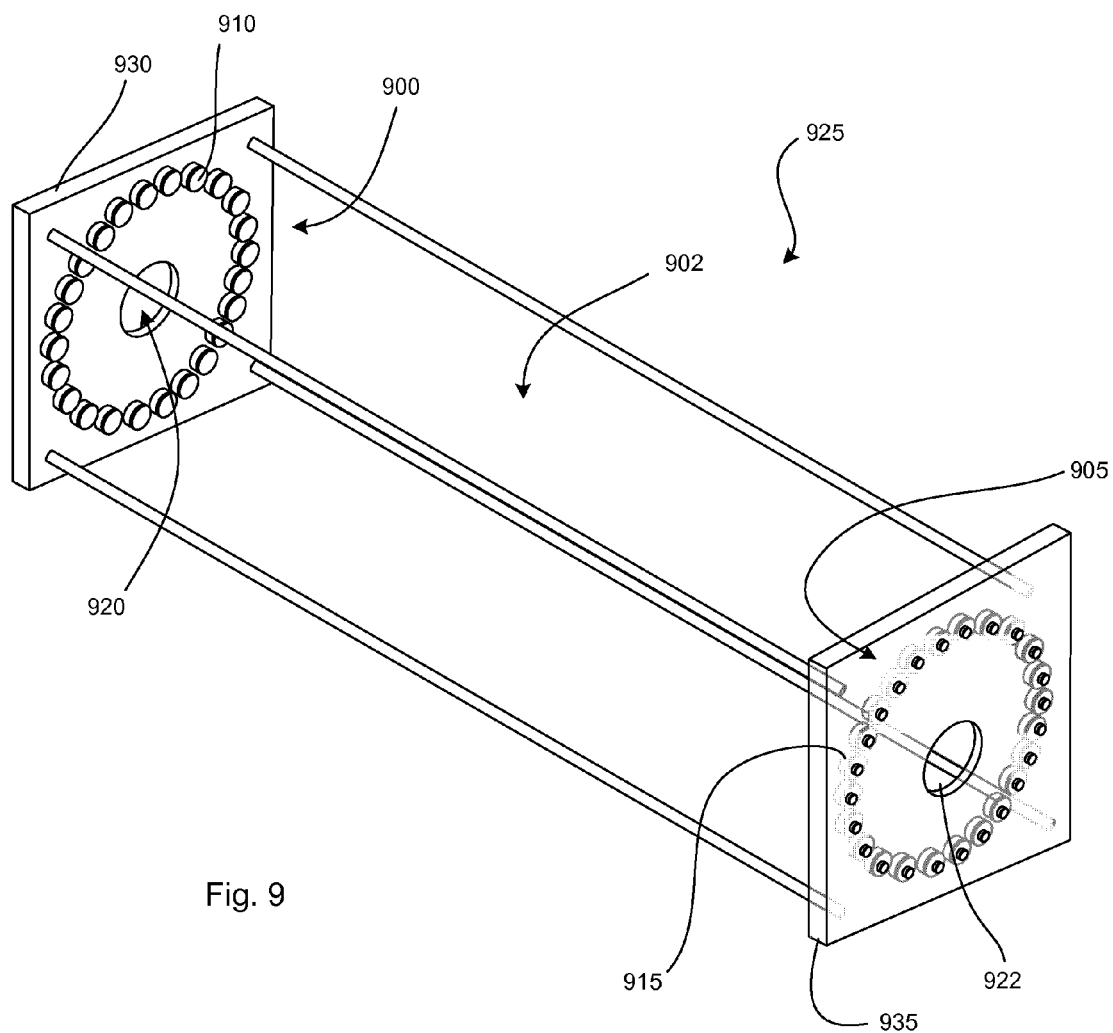
FIG. 9 is a perspective view of an exemplary multi-pass optical apparatus that can be used in the optical system of FIG. 1.

Moreover, the geometry of the reflecting surfaces in each of the sets 200, 205 can depend on the f-number (that is, the ratio of the focal length of the reflecting surfaces and the "effective" aperture diameter or beam size, which is taken along the plane perpendicular to the optical axis of the optical beam 130) of the optical apparatus 225. Thus, for example, for reflecting surfaces having lower f-numbers, such as 3 (a 25 mm effective aperture diameter and a 75 mm focal length) a circular pattern (such as shown in FIG. 9) for the reflecting surfaces, rather than a linear array (such as shown in FIGS. 2-8) may be more suitable. In one implementation, the reflecting surfaces have an f-number of 40 with a 25 mm effective aperture diameter and a 1 m focal length.

Referring to FIG. 9, as mentioned above, in another implementation, an optical apparatus 925 includes a circular pattern of concave reflecting surfaces 910 for the first set 900 and a similar circular pattern of concave reflecting surfaces 915 for the second set 905, both of which define a region 902. In this implementation, the reflecting surfaces 910, 915 of each respective set 900, 905 are arranged so that centers of the reflecting surfaces 910, 915 are on a perimeter of a circle. The first set 900 is mounted on a first base 930 and the second set 905 is mounted on a second base 935. Moreover, an entrance 920 is defined by an opening formed in the first base 930 and an exit 922 is defined by an opening formed in the second base 935. The optical beam 130 travels through the entrance 920 to enter the optical apparatus 925 and travels through the exit 922 to exit the optical apparatus 925. The reflecting surface 910 and 915 can be affixed to respective substrates, which are attached to plates that can be mounted to the respective bases 930, 935, in a similar fashion as the substrates and plates shown in FIGS. 2-8.

Figure 10:
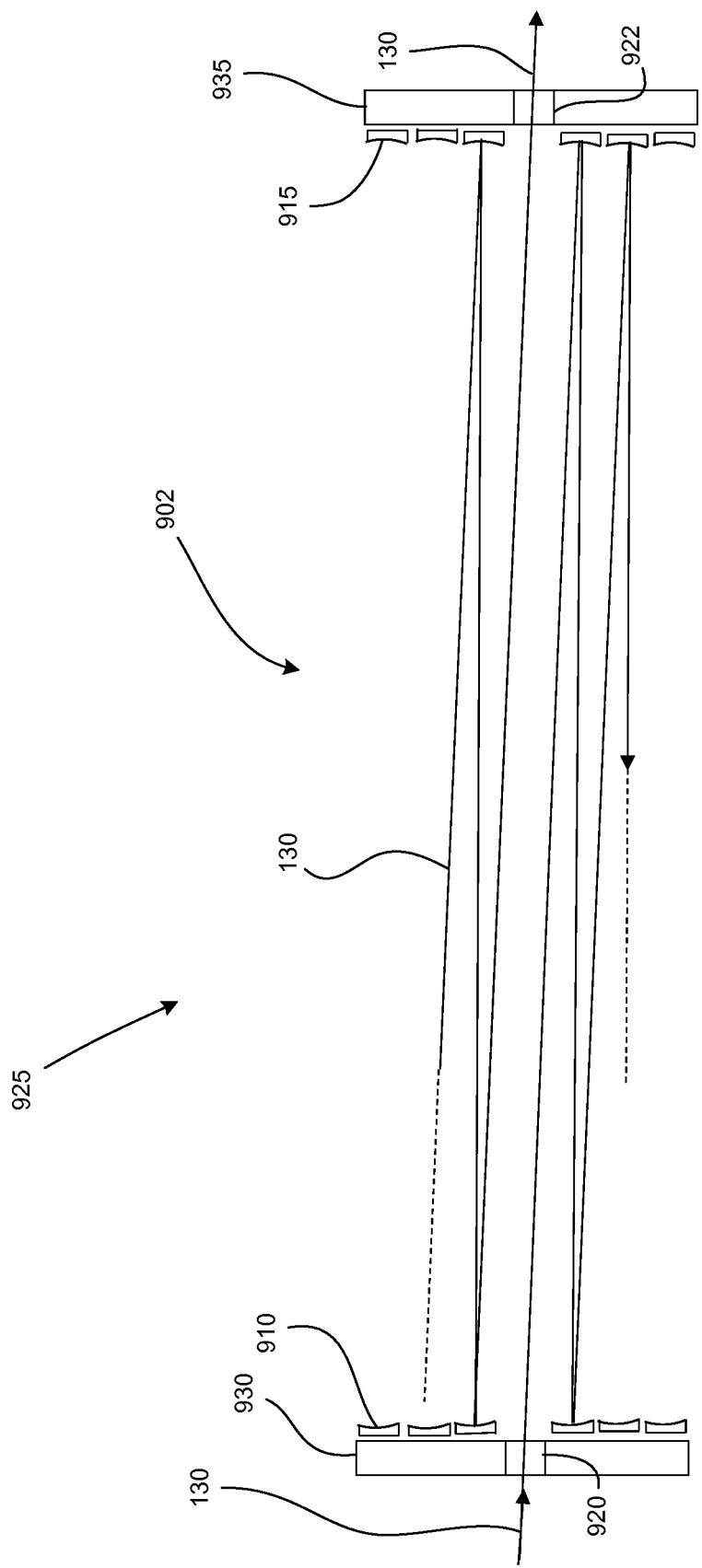
FIG. 10 is a side view of the multi-pass optical apparatus of FIG. 9, showing an exemplary optical path.
Figure 11A:
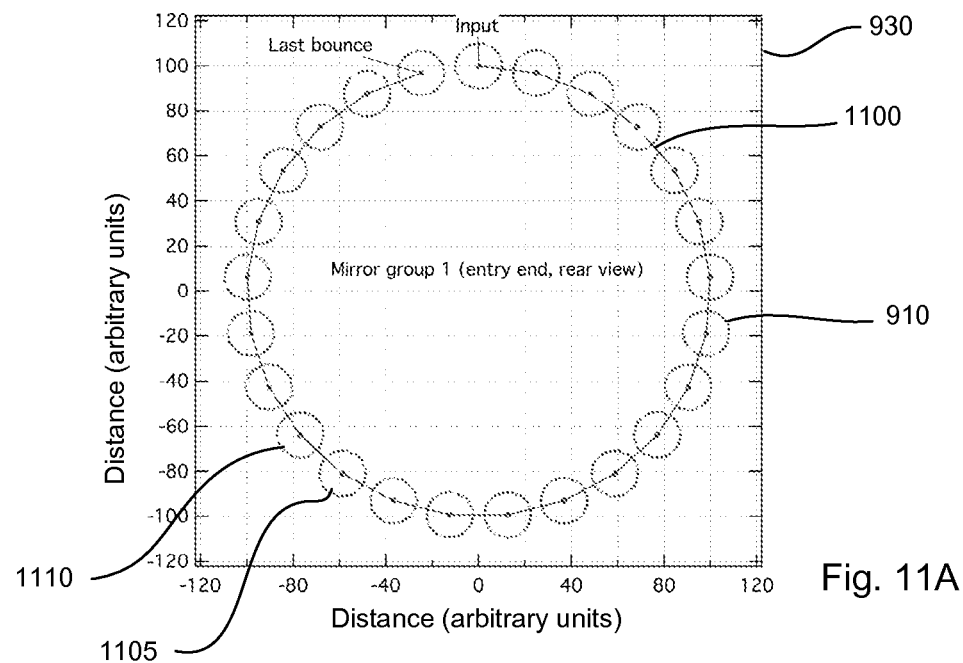
FIG. 11A is a plan view of a first set of reflecting surfaces of the multi-pass optical apparatus of FIGS. 9 and 10, showing a sequence of bounces at the reflecting surfaces of the first set.
Figure 11B:
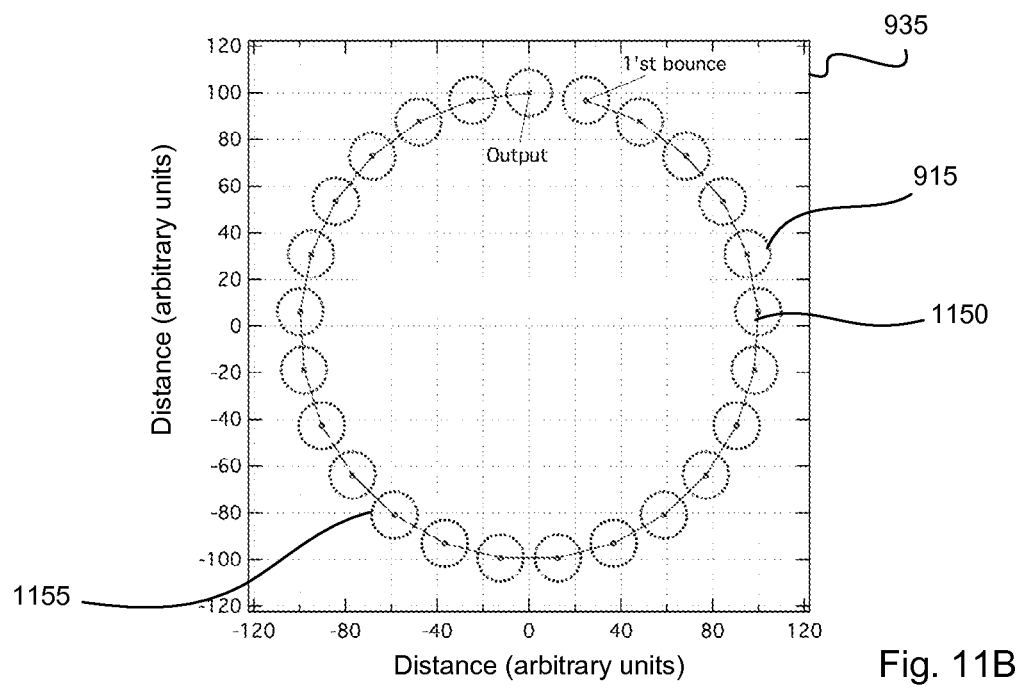
FIG. 11B is a plan view of a second set of reflecting surfaces of the multi-pass optical apparatus of FIGS. 9 and 10, showing a sequence of bounces at the reflecting surfaces of the second set.

As shown in FIGS. 10, 11A, and 11B, the optical beam 130 enters the optical apparatus 925 through the entrance 920, travels across the region 902, then reflects off one of the reflecting surfaces 915 of the second set 905, at which point it reflects back toward a reflecting surface 910 of the first set 900, and goes back and forth between the first and second sets 900, 905 without striking any of the reflecting surfaces 910, 915 more than once until it passes through the exit 922 and exits the optical apparatus 925.

As shown in FIG. 11A, the optical beam 130 follows a trace 1100 as it reflects off each of the reflecting surfaces 910 of the first set 900. As shown in FIG. 11B, the optical beam 130 also follows a trace 1150 as it reflects off each of the reflecting surfaces 915 of the second set 905. Taking two adjacent reflecting surfaces 1105, 1110 of the first set 900 and one reflecting surface 1155 of the second set 905 as an example, the optical beam 130 reflects from the reflecting surface 1105 of the first set 900, travels across the region 902 between the bases 930, 935, then reflects from the reflecting surface 1155 of the second set 905, after which the optical beam 130 travels back across the region 902 between the bases 930, 935 and impinges upon the reflecting surface 1110. The shape of the reflecting surface 1155 of the second set 905 is such that the optical beam 130 is re-imaged from the surface 1105 of the first set 900 to the surface 1110 of the first set 900. Moreover, overlap of the optical beam 130 on the reflecting surface 1155 of the second set 905 is avoided. More generally, overlap of the optical beam 130 on each of the reflecting surfaces of both sets 900, 905 is avoided. The re-imaging of the optical beam 130 occurs for each of the reflecting surfaces in each of the sets 900, 905 after the optical beam 130 passes through the entrance 920 and reflects off the first reflecting surface of the second set 905 and prior to the optical beam 130 passing through the exit 922. Additionally, the beam size of the optical beam 130 is maintained as it travels from the reflecting surface 1105 to the reflecting surface 1110 after being reflected from the reflecting surface 1155 (that is, the beam size of the optical beam 130 is generally the same at the reflecting surface 1110 as it is at the reflecting surface 1105 due to the concavity of the reflecting surfaces of both sets 900, 905).

The optical apparatus, such as apparatus 125 or 925, can be configured with an even number of reflecting surfaces 210 or 910 for the first set 200 or 900, respectively. Likewise, the optical apparatus, such as system 125 or 925, can be configured with an even number of reflecting surfaces 215 or 915 for the second set 205 or 905, respectively.

Figure 12:
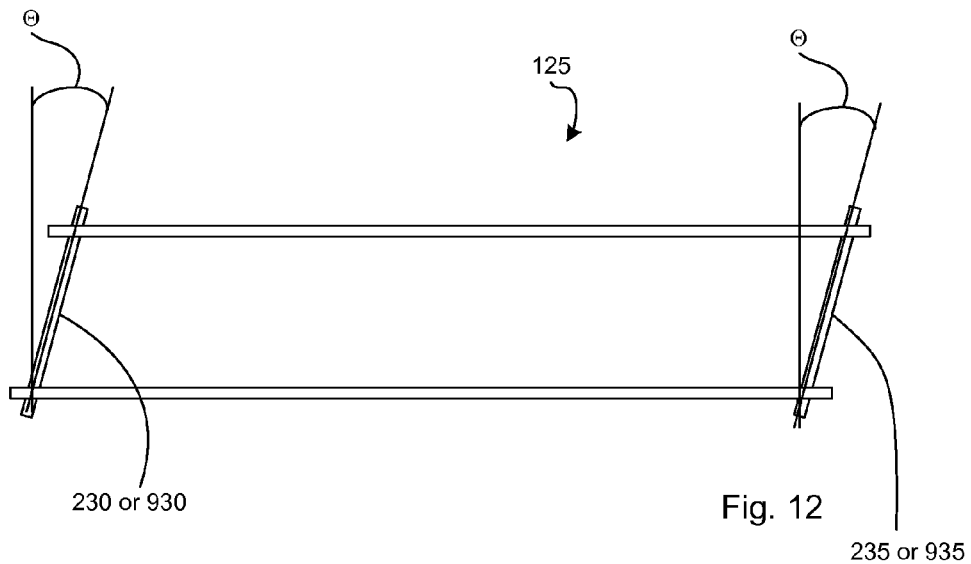
FIG. 12 is a block diagram of a multi-pass optical apparatus that can be used in the optical system of FIG. 1 in which a system alignment error, racking, is introduced to the optical apparatus.

Referring to FIG. 12, the optical apparatus 125 can be designed to be insensitive to racking, in which the bases supporting the reflecting surfaces are moved in a similar manner by an outside force, that it, the bases tilt in the same direction by an angle $\Theta$. If the optical apparatus 125 has an even number of reflecting surfaces for each base, then such racking would not cause a noticeable change in the trace of the optical beam 130 through the optical apparatus 125 and therefore the position or direction of the optical beam 130 exiting the optical apparatus 125 remains unchanged or substantially unchanged. Moreover, for an even number of reflecting surfaces, the pointing of the optical beam 130 as it reflects off the last reflecting surface and exits through the exit of the optical apparatus 125 does not change even if the optical apparatus 125 suffers racking.

Figure 13:
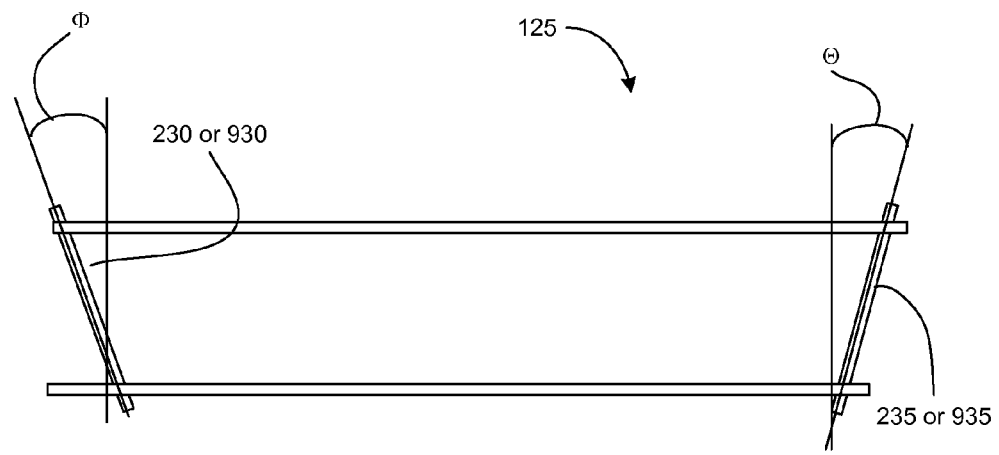
FIG. 13 is a block diagram of a multi-pass optical apparatus that can be used in the optical system of FIG. 1, in which a system alignment error, bending, is introduced to the apparatus.

Referring to FIG. 13, the optical apparatus 125 can be designed to be insensitive to bending, which can occur by differential thermal expansion of the system frame, which includes the bases and the rigid spacers connecting the bases. Bending of the system frame can cause a shift in the optical beam 130 on every other reflecting surface on each end of the optical apparatus 125. If the optical apparatus 125 is designed with an even number of reflecting surfaces for each of the first and second sets, then the optical beam 130 output from the optical apparatus 125 will be insensitive to bending of the system frame.

While the optical apparatus 125 is shown in a configuration between a master oscillator 135 and an amplifier 140 as part of an EUV optical source, the optical apparatus 125 can be used in a deep ultraviolet (DUV) optical source or other types of optical arrangements.

Figure 14:
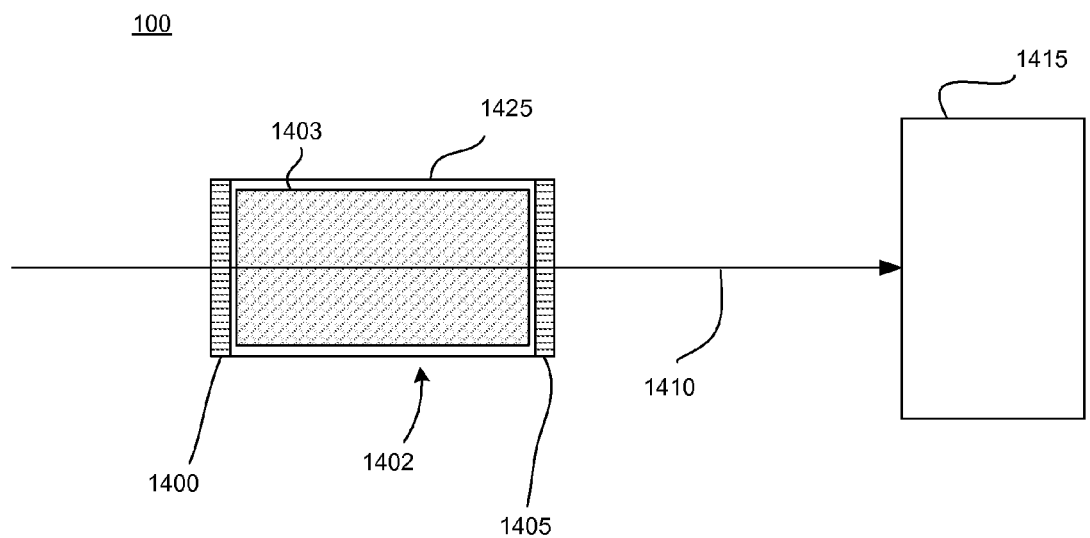
FIG. 14 is a block diagram of an exemplary optical system including a multi-pass optical apparatus.

For example, referring to FIG. 14, in another implementation, an optical apparatus 1425 is implemented as an optical amplifier. In this case, the optical apparatus 1425 includes a gain medium 1403 within the region 1402 between the first set 1400 and the second set 1405 of reflecting surfaces. The optical apparatus 1425 can be included as part of a larger system, that includes other components, such as a master oscillator or a beam conditioning unit. The output of the optical apparatus 1425 is generally directed toward equipment 1415.

Figure 15A:
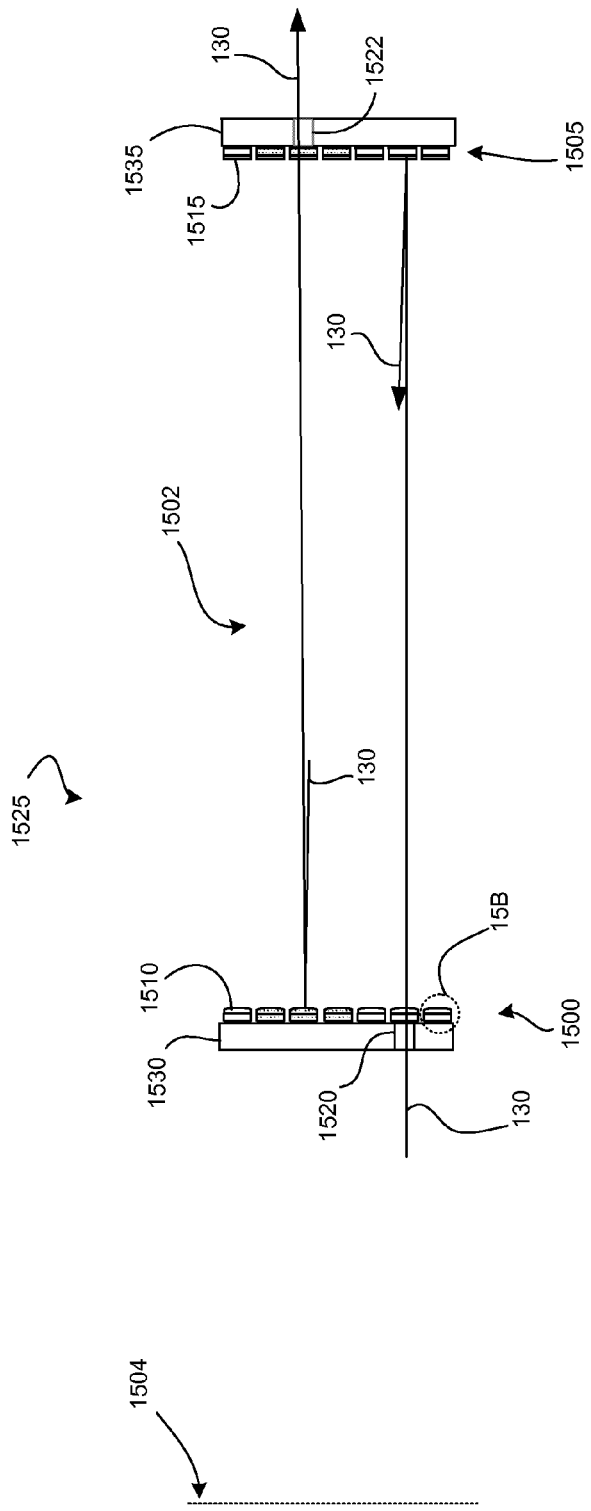
FIG. 15A is a side view of an exemplary multi-pass optical apparatus having a set of convex reflecting surfaces that can be used in the optical systems of FIG. 1 or 14.
Figure 15B:
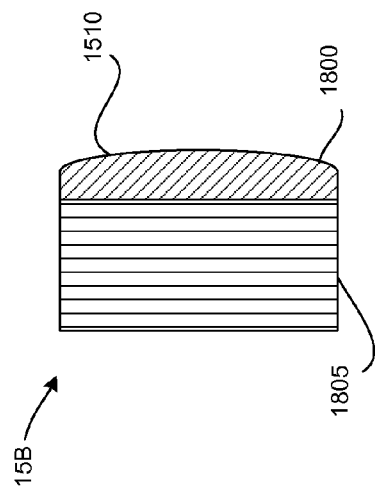
FIG. 15B is a side cross-sectional view of a convex reflecting surface and substrate of a first set of reflecting surfaces of the multi-pass optical apparatus of FIG. 15A.

Referring also to FIGS. 15A and 15B, in another implementation, the optical apparatus 1525 is designed with one of the sets of reflecting surfaces having convex reflecting surfaces. In this implementation, the first set 1500 has convex reflecting surfaces 1510. Each of the reflecting surfaces 1510 of the first set 1500 can be formed as a coating on a substrate 1800. Each of the reflecting surfaces 1510 of the first set 1500 is convex (also called diverging) in that the surfaces are bulging outward, away from the substrate 1800, as shown by the cross-sectional view in FIG. 15B. The convex shape can be spherical, or another suitable shape, depending on the focal length of each of the reflecting surfaces and the beam size of the optical beam 130. Each substrate 1800 can be attached to a plate 1805, which is movably attached to the base 1530, in a similar fashion as that discussed above. The two sets of reflective surfaces are quasi-confocal, then the optical beam 130 forms a virtual beam waist outside of the region 1502 along a plane labeled 1504. Such a design has an advantage that no true beam waist exists and therefore avoids the presence of an intermediate focus, so that you would reduce problems associated with air breakdown for a high power optical beam 130. However, the size of the optical beam 130 at each set of reflective surfaces is different.

In other implementations, the reflecting surfaces of the optical apparatuses 125, 225, 1425, 1525 can be arranged in an elliptical configuration, a polygonal configuration, or another array configuration.

In other implementations, the reflecting surfaces can be astigmatic in shape, that is, having different curvatures in the two directions that are perpendicular to the optical axis of the optical beam 130. In such a system, the beam waist in one of the directions could be located at a different location along the optical axis than the beam waist in the other of the directions.

Other implementations are within the scope of the following claims.

What is claimed is:

1. A method comprising:
reflecting an optical beam back and forth between reflecting surfaces of a first plurality of reflecting surfaces and reflecting surfaces of a second plurality of reflecting surfaces without passing the optical beam through a gain medium, the reflecting including:
re-imaging the optical beam at a reflecting surface of one of the pluralities after only one reflection from a reflecting surface of the other of the pluralities including re-imaging the optical beam from a first reflecting surface of the first plurality onto a second reflecting surface of the first plurality by reflecting the optical beam from a reflecting surface of the second plurality without medium; and
avoiding overlap of two or more optical beams on each of the reflecting surfaces of both of the pluralities.

2. The method of claim 1, wherein the second reflecting surface of the first plurality on which the optical beam is re-imaged is adjacent to the first reflecting surface of the first plurality.

3. The method of claim 1, wherein reflecting the optical beam back and forth between reflecting surfaces of the first plurality of reflecting surfaces and reflecting surfaces of the second plurality of reflecting surfaces includes re-imaging the optical beam from a first reflecting surface of the second plurality onto a second reflecting surface of the second plurality.

4. The method of claim 3, wherein re-imaging the optical beam from the first reflecting surface of the second plurality onto the second reflecting surface of the second plurality includes reflecting the optical beam from a reflecting surface of the first plurality.

5. The method of claim 1, wherein re-imaging the optical beam at a reflecting surface of one of the pluralities after only one reflection from a reflecting surface of the other of the pluralities includes forming a beam waist between the first and second pluralities of reflecting surfaces.

6. The method of claim 1, wherein re-imaging the optical beam at a reflecting surface of one of the pluralities after only one reflection from a reflecting surface of the other of the pluralities includes forming a virtual beam waist outside a region between the first and second pluralities of reflecting surfaces.

7. The method of claim 1, further comprising directing the optical beam through an opening within the first plurality of reflecting surfaces and toward the second plurality of reflecting surfaces prior to reflecting the optical beam back and forth.

8. The method of claim 1, further comprising directing the optical beam through an opening within the second plurality of reflecting surfaces and away from the first plurality of reflecting surfaces after to reflecting the optical beam back and forth.

9. An apparatus comprising:
a first plurality of concave reflecting surfaces;
a second plurality of reflecting surfaces facing the first plurality of concave reflecting surfaces such that a region is defined between the first and second pluralities, wherein the region lacks a gain medium; and
an input for an optical beam to enter the region and an output for the optical beam to exit the region;
wherein:
the first and second pluralities of reflecting surfaces are arranged relative to each other so that the optical beam is re-imaged at a reflecting surface of one of the pluralities after only one reflection from a reflecting surface of the other of the pluralities including re-imaging the optical beam from a first reflecting surface of the first plurality onto a second reflecting surface of the first plurality by reflecting the optical beam from a reflecting surface of the second plurality; and
so that overlap of two or more optical beams on each of the reflecting surfaces is avoided.

10. The apparatus of claim 9, wherein each concave reflecting surface of the first plurality is formed on a distinct substrate.

11. The apparatus of claim 10, wherein each substrate of the first plurality is separately movable from the other substrates of the first plurality.

12. The apparatus of claim 9, wherein each reflecting surface of the second plurality is formed on a distinct substrate.

13. The apparatus of claim 12, wherein each substrate of the second plurality is separately movable from the other substrates of the second plurality.

14. The apparatus of claim 9, wherein a number of concave reflecting surfaces of the first plurality is even.

15. The apparatus of claim 9, wherein a number of reflecting surfaces of the second plurality is even.

16. The apparatus of claim 9, wherein the concave reflecting surfaces of the first plurality are arranged so that centers of the concave reflecting surfaces are on a perimeter of a circle.

17. The apparatus of claim 16, wherein the reflecting surfaces of the second plurality are arranged so that centers of the reflecting surfaces are on a perimeter of a circle.

18. The apparatus of claim 9, wherein each of the reflecting surfaces of the second plurality is a concave reflecting surface.

19. The apparatus of claim 18, wherein the first and second pluralities of reflecting surfaces are arranged relative to each other so that a beam waist of the optical beam is formed inside the region.

20. The apparatus of claim 9, wherein each of the reflecting surfaces of the second plurality is a convex reflecting surface.

21. The apparatus of claim 20, wherein the first and second pluralities of reflecting surfaces are arranged relative to each other so that a virtual beam waist of the optical beam is formed outside the region.

22. The apparatus of claim 9, wherein a curvature of each of the concave reflecting surfaces of the first plurality is selected such that the optical beam is re-imaged after each reflection from a reflecting surface of the second plurality.

23. An optical source comprising:
a master oscillator that outputs an optical beam;
at least one amplifier that receives the optical beam; and
an optical delay apparatus between the master oscillator and the at least one amplifier, the optical delay apparatus comprising:
a first plurality of concave reflecting surfaces;
a second plurality of reflecting surfaces facing the first plurality of concave reflecting surfaces, such that a region is defined between the first and second pluralities; and
an input for the optical beam to enter the region and an output for the optical beam to exit the region;

wherein:
the first and second pluralities of reflecting surfaces are arranged relative to each other so that the optical beam is re-imaged at a reflecting surface of one of the pluralities after only one reflection from a reflecting surface of the other of the pluralities including re-imaging the optical beam from a first reflecting surface of the first plurality onto a second reflecting surface of the first plurality by reflecting the optical beam from a reflecting surface of the second plurality; and
so that overlap of two or more optical beams on each of the concave reflecting surfaces is avoided.

24. The apparatus of claim 9, wherein the foci of each of the reflecting surfaces of both pluralities are along a plane between the two pluralities.

* * * * *